(No Model.)

R. MAYS.
FRUIT PICKER.

No. 487,931. Patented Dec. 13, 1892.

WITNESSES
Geo. E. Fuch.
Rol. E. Fitzgerald

INVENTOR
Roseanna Mays
Lehmann Pattison Hecht
Attys

UNITED STATES PATENT OFFICE.

ROSEANNA MAYS, OF STRASBURG, OHIO.

FRUIT-PICKER.

SPECIFICATION forming part of Letters Patent No. 487,931, dated December 13, 1892.

Application filed July 9, 1892. Serial No. 439,548. (No model.)

*To all whom it may concern:*

Be it known that I, ROSEANNA MAYS, of Strasburg, in the county of Tuscarawas and State of Ohio, have invented certain new and useful Improvements in Fruit-Pickers; and I do hereby declare the following to be a full, clear, and exact description of the invention, such as will enable others skilled in the art to which it pertains to make and use it, reference being had to the accompanying drawings, which form part of this specification.

My invention relates to an improvement in fruit-pickers; and it consists in the novel features of construction, which will be fully described hereinafter, and more particularly referred to in the claims.

The object of my invention is to construct an improved device for removing both large and small fruit from trees without bruising it, as is ordinarily the case when the same is allowed to fall upon the ground.

Figure 1:
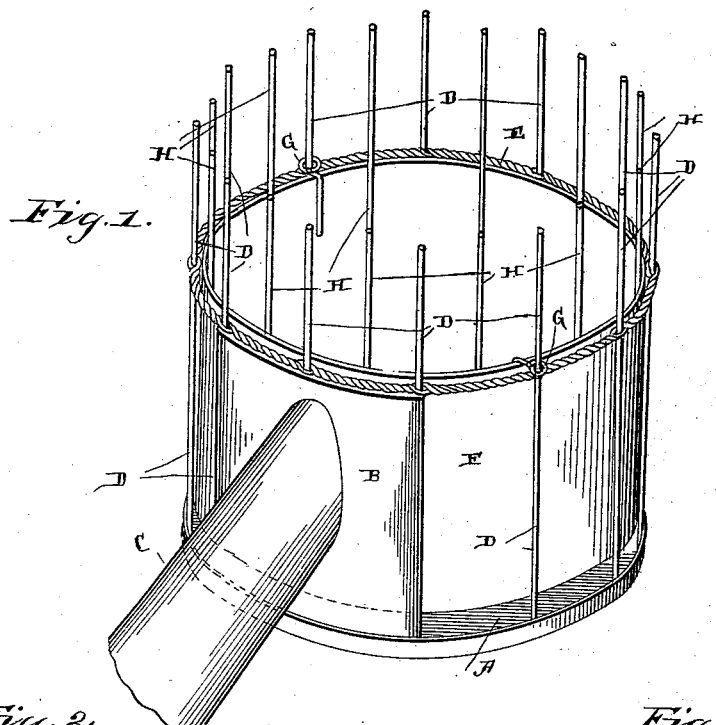
Figures 2, 3:
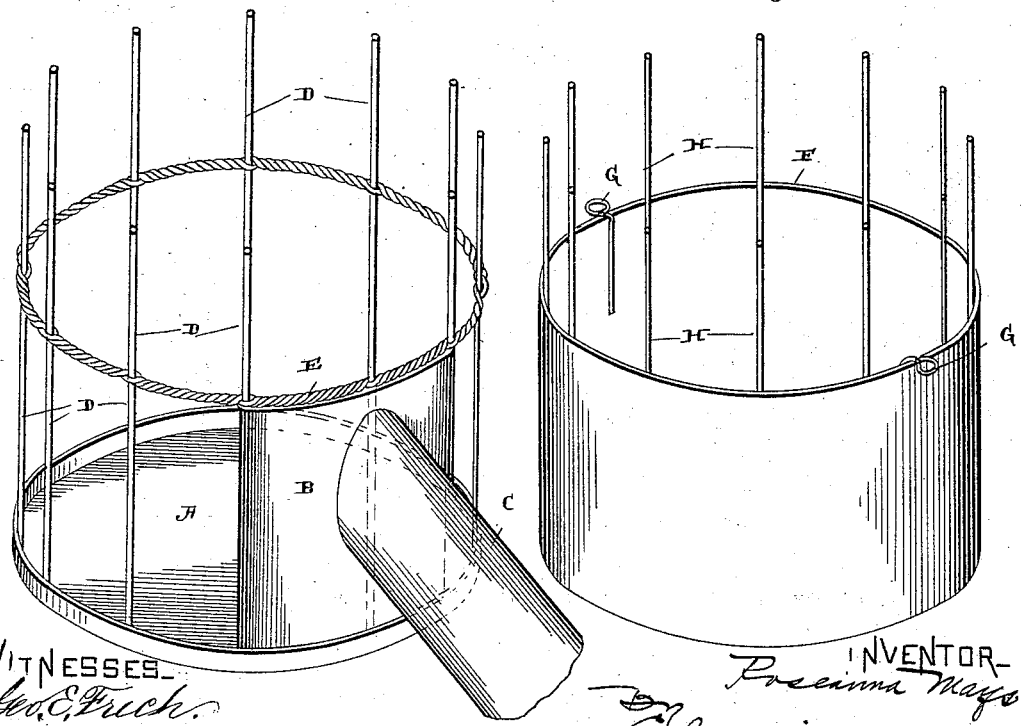

Referring to the accompanying drawings, Figure 1 is a perspective view of my improved device complete. Fig. 2 is a similar view when arranged for picking large fruit. Fig. 3 is a perspective view of the removable frame.

A represents the bottom of the picker, and secured to the side section B, projecting upward therefrom, is the handle-socket C. Secured at their lower ends to the bottom A are the upright rods or wires D, which are arranged, as shown, at intervals around its edge, and for bracing these wires in their extended positions is the encircling brace-wire E, which connects the same near their upper ends, and by this construction quite a rigid frame is formed. For picking large fruit this above-described construction, as illustrated in Fig. 2, is employed, the wires D being sufficiently close together to prevent the fruit from falling out. For removing small fruit it is necessary to close the said spaces and also to make the spaces narrower at the upper ends of the wires, where they pass on opposite sides of the fruit-stems, so that the fruit will not pass through them when being picked. To accomplish these ends, a circular frame F is provided, which is adapted to fit within the space inclosed by the wires D, the same extending up about as far on the wires D as the brace E. Projecting from opposite sides of the upper edge of the said frame are the loop-wires G, which pass down over the wires D, as shown, and thus prevent the frame from moving out of its correct position. Also projecting from the said frame are the wires H, which correspond with the wires D in height, and are so arranged in relation thereto that when the frame F is in place the spaces between the wires D will be just half as wide as when the same is removed, as shown in Fig. 2.

In operation the picker is passed up under the fruit with the latter resting therein and the stem extending outward between the vertically-projecting wires. An outward pull on the picker will sever the fruit from the branch or limb, allowing it to fall back in the picker, in which it can be lowered to the ground without injury.

Having thus described my invention, I claim—

1. A fruit-picker comprising a base or bottom, wires projecting vertically from the edge thereof, a vertical removable frame adapted to fit within the space inclosed by the wires and which is of less height than the latter, and wires H, projecting from said frame, substantially as shown and described.

2. A fruit-picker comprising a base or bottom, wires projecting vertically from the edge thereof, a removable frame F, adapted to fit the space inclosed by the wires, but which is of less height than the latter, vertical wires H, secured to said frame, and loops G, arranged on the said frame between the wires H, which fit over the first-named wires, for the purpose shown and described.

In testimony whereof I affix my signature in presence of two witnesses.

ROSEANNA MAYS.

Witnesses:
E. W. SPIDELL,
EMMA McCLINTOCK.